(12) United States Patent
Jeong et al.

(10) Patent No.: US 7,531,983 B2
(45) Date of Patent: May 12, 2009

(54) METHOD OF CONTROLLING STARTUP CURRENT OF MOTOR AND DISK DRIVE USING THE METHOD

(75) Inventors: Jun Jeong, Suwon-si (KR); Kwang-jo Jung, Suwon-si (KR); Da-woon Chung, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 178 days.

(21) Appl. No.: 11/248,161

(22) Filed: Oct. 13, 2005

(65) Prior Publication Data

US 2006/0097679 A1    May 11, 2006

(30) Foreign Application Priority Data

Nov. 6, 2004  (KR) .................... 10-2004-0090140

(51) Int. Cl.
  *H02P 1/16*  (2006.01)
  *H02H 7/08*  (2006.01)
  *H02H 7/00*  (2006.01)

(52) U.S. Cl. .................. 318/778; 318/455; 318/82; 318/64; 361/7; 361/23; 361/31; 361/33; 713/1

(58) Field of Classification Search ............ 318/138, 318/254, 439, 455, 700, 568.18, 64, 82, 778, 318/785, 445; 361/5–7, 15–17, 21, 23, 31, 361/33, 53; 713/1, 2
See application file for complete search history.

(56) References Cited

U.S. PATENT DOCUMENTS

| | | | |
|---|---|---|---|
| 5,216,343 A * | 6/1993 | Genheimer et al. | 318/568.18 |
| 6,377,090 B1 * | 4/2002 | Bruno | 327/143 |
| 6,597,140 B2 * | 7/2003 | Takayama et al. | 318/445 |
| 6,777,899 B1 * | 8/2004 | Plutowski | 318/254 |
| 6,900,604 B2 * | 5/2005 | Kokami et al. | 318/254 |
| 7,065,605 B2 * | 6/2006 | Yeow et al. | 711/4 |
| 2002/0079856 A1 * | 6/2002 | Hill et al. | 318/560 |
| 2005/0028023 A1 * | 2/2005 | Yeow et al. | 714/3 |
| 2007/0274000 A1 * | 11/2007 | Andoh et al. | 360/75 |

FOREIGN PATENT DOCUMENTS

| | | |
|---|---|---|
| JP | 01-122073 | 5/1989 |
| JP | 8-275579 | 10/1996 |
| JP | 2003-123374 | 4/2003 |
| KR | 10-0365619 | 12/2002 |

* cited by examiner

*Primary Examiner*—Walter Benson
*Assistant Examiner*—Eduardo Colon-Santana
(74) *Attorney, Agent, or Firm*—Staas & Halsey LLP

(57) ABSTRACT

Provided is a method and apparatus for controlling a motor of a disk drive. The method is used to stably control the startup current of a motor by considering a voltage drop and the disk drive uses the method. The method includes managing power-on reset retry information generated during the startup of the motor and determining the startup current of the motor that corresponds to a power-on reset retry count included in the power-on reset retry information.

16 Claims, 5 Drawing Sheets

FIG. 6A

| EXAMPLES OF GARBAGE VALUES AFTER POWER SUPPLY (THESE AREAS ARE NOT INITIALIZED) |
|---|

| EXAMPLES OF DATA ID AND DATA RETRY # (FIRST TWO DATA: ID, LAST DATA: RETRY #) |
|---|

```
0700 : 0000   0000 0000 0000 0000 0000 0000 0000
0708 : 55aa  a5a5  0000  0000 0000 0000 0000 0000
0710 : 0000 0000 0000 0000 0000 0000 0000 0000
 ... :  ...   ...   ...   ...   ...   ...   ...   ...
 ... :  ...   ...   ...   ...   ...   ...   ...   ...
```

METHOD OF CONTROLLING STARTUP CURRENT OF MOTOR AND DISK DRIVE USING THE METHOD

CROSS-REFERENCE TO RELATED APPLICATION

This application claims the benefit of Korean Patent Application No. 10-2004-0090140, filed on Nov. 6, 2004, in the Korean Intellectual Property Office, the disclosure of which is incorporated herein in its entirety by reference

BACKGROUND OF THE INVENTION

1. Field of the Invention

The present invention relates to a method and apparatus for controlling a motor of a disk drive, and more particularly, to a method of stably controlling the startup current of a motor in consideration of a voltage drop and a disk drive using the method.

2. Description of the Related Art

U.S. Pat. No. 5,412,809 discloses a circuit and a method for controlling current supplied to a disk drive, which can reduce power consumption associated with the startup of a spindle motor using a micro controller and a memory that stores current versus access time tables. Japanese Patent Laid-Open Publication No. hei 8-275579 discloses a method of driving a spindle motor by supplying power of a predetermined voltage from a power supply unit to a driving signal generating unit, detecting whether a frequency synchronized with the rotation of the spindle motor is within a predetermined range, and varying the driving voltage of the spindle motor if the frequency is outside the predetermined range.

Drives employing a spindle motor include hard disk drives (HDDs), compact disk-read only memory (CD-ROM) drives, digital versatile disk (DVD) drives, and so on. In general, if power is supplied to a disk drive, the disk drive enters an initial mode for starting a spindle motor to rotate a disk. To enable the initially static disk to reach a target rotating speed, much power consumption is required.

Accordingly, the disk drive consumes the most current when initially starting the spindle motor as shown in FIG. 4, and a voltage of power supplied to the disk drive drops due to the excessive current necessary for the initial startup of the spindle motor. If the voltage drops below a predetermined value, stable operation of the disk drive cannot be guaranteed. Accordingly, a power-on reset (POR) signal transits to a logic low level to restart the disk drive, as shown in FIG. 5.

If power supplied to the disk drive is unstable or the resistance of a power line in a printed circuit board (PCB) is large, a greater voltage drop occurs, such that the possibility that the power-on reset signal will transit to a logic low level at the startup of the spindle motor further increases.

Accordingly, if the voltage of power supplied for the startup of the spindle motor drops below a threshold value, the disk drive is repeatedly restarted due to the power-on reset signal, thereby making normal operation of the disk drive impossible.

SUMMARY OF THE INVENTION

The present invention provides a method of controlling the startup current of a spindle motor by detecting whether a power-on reset occurs at the startup of the spindle motor and adaptively varying the startup current of the spindle motor, and a disk drive using the method.

According to an aspect of the present invention, there is provided a method of controlling a motor of a disk drive, the method including: managing power-on reset retry information generated during the startup of the motor; and determining the startup current of the motor that corresponds to a power-on reset count included in the power-on reset retry information.

According to another aspect of the present invention, there is provided a data storage disk drive including: a disk storing information; a motor rotating the disk; a recording medium storing power-on reset retry information; a reset determination unit monitoring a voltage of power and generating a power-on reset control signal if a voltage less than a power-on reset threshold voltage is detected; a controller performing a power-on reset according to the power-on reset control signal, managing the power-on reset retry information stored in predetermined areas of the recording medium, which are not initialized during power-on initialization, and determining the startup current of the motor corresponding to a power-on reset retry count included in the power-on reset retry information; and a driver generating the motor startup current corresponding to the startup current of the motor determined by the controller and supplying the generated motor startup current to the motor.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 6A is a table illustrating a state where a memory is initialized after power supply according to the present invention; and FIG. 6B is a table illustrating a state where power-on reset retry information is stored in specific areas of the memory according to the present invention.

DETAILED DESCRIPTION OF THE PREFERRED EMBODIMENTS

Figure 1:
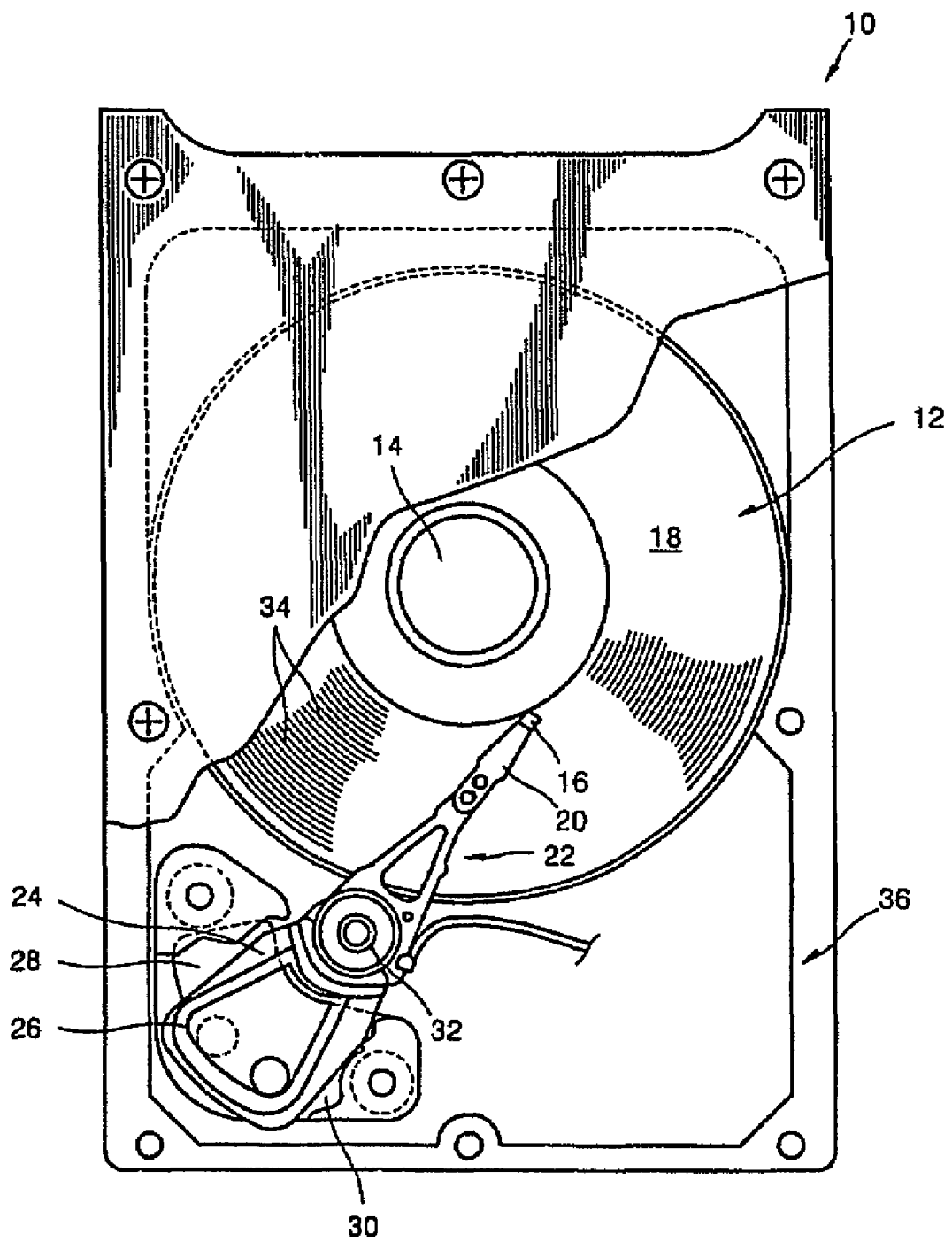
FIG. 1 is a top view of a hard disk drive (HDD) to which the present invention is applied.

Reference will now be made in detail to the embodiments of the present invention, examples of which are illustrated in the accompanying drawings, wherein like reference numerals refer to like elements throughout. The embodiments are described below to explain the present invention by referring to the figures. For convenience of explanation, a hard disk drive (HDD) is explained as an example. However, it is clear that a disk drive used in the present invention is not limited to an HDD.

FIG. 1 is a top view of an HDD 10 to which the present invention is applied. The HDD 10 includes at least one disk 12 that is rotated by a spindle motor 14. The HDD 10 further includes a transducer 16 that is located adjacent to a disk surface 18.

The transducer 16 can read or write information on the rotating disk 12 by detecting a magnetic field of each disk 12 and magnetizing the disk 12. The transducer 16 is generally associated with the disk surface 18. Although the transducer 16 is illustrated as one body, the transducer 16 comprises a write transducer for magnetizing the disk 12 and a separate read transducer for detecting a magnetic field of the disk 12. The read transducer consists of a magneto-resistive (MR) element. The transducer 16 is generally referred to as a head.

The transducer 16 can be combined with a slider 20. The slider 20 generates an air bearing between the transducer 16 and the disk surface 18, and is incorporated into a head gimbal assembly 22. The head gimbal assembly 22 is attached to an actuator arm 24 having a voice coil 26 located adjacent to a magnetic assembly 28 that specifies a voice coil motor (VCM). Current supplied to the voice coil 26 generates torque for rotating the actuator arm 24 about a bearing assembly 32. The rotation of the actuator arm 24 causes the transducer 16 to move over across the disk surface 18.

Information is typically stored in annular tracks 34 of the disk 12. Each of the tracks 34 generally includes a plurality of sectors, and each of the sectors consists of a data field and an identification field. The identification field includes a gray code that identifies the sector and the track (cylinder). The transducer 16 moves across the disk surface 18 to read or write information on other tracks.

Figure 2:
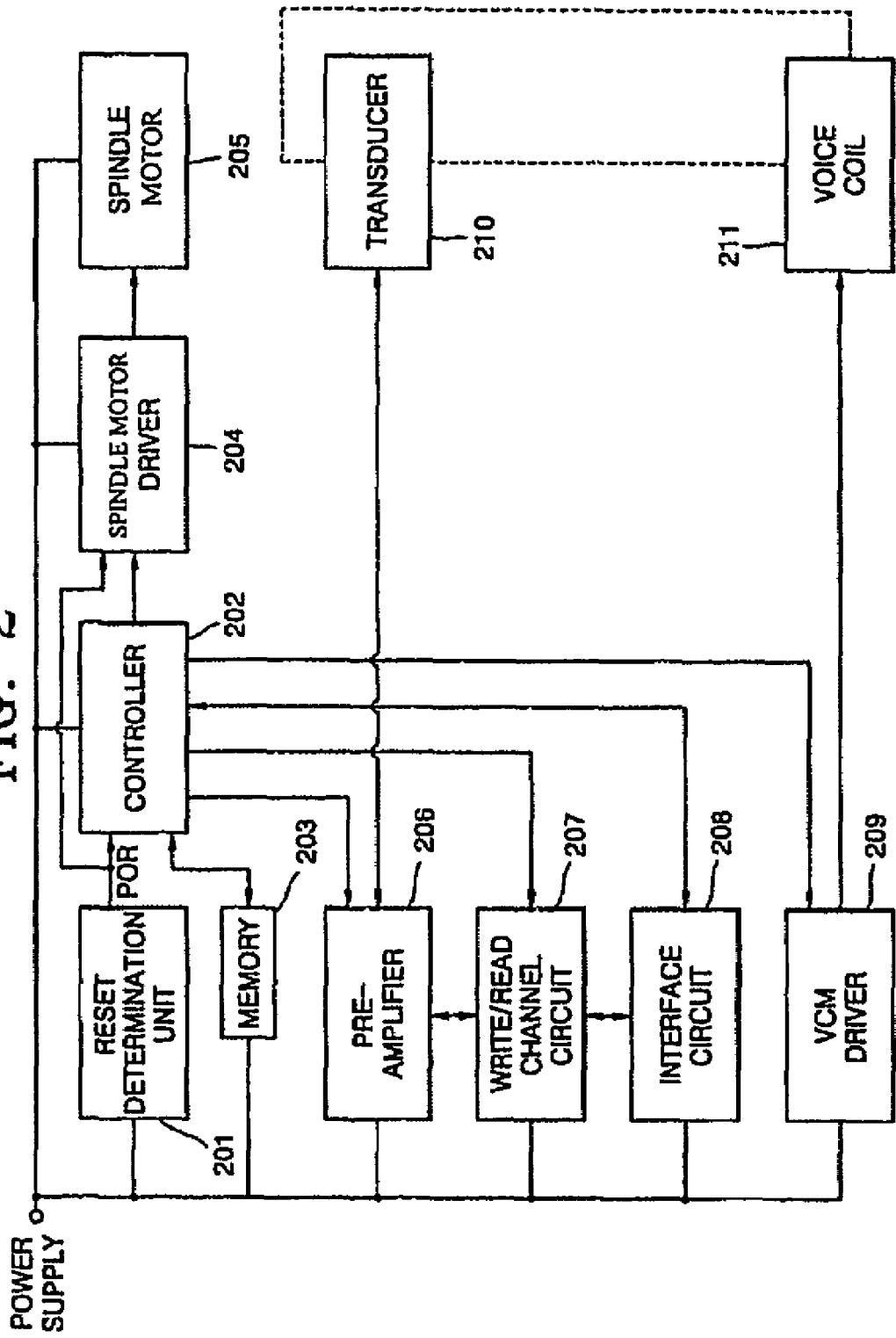
FIG. 2 is an electrical block diagram of an HDD according to an embodiment of the present invention.

FIG. 2 is an electrical block diagram of an HDD according to an embodiment of the present invention. As shown in FIG. 2, the HDD includes a reset determination unit 201, a controller 202, a memory 203, a spindle motor driver 204, a spindle motor 205, a pre-amplifier 206, a write/read channel circuit 207, an interface circuit 208, a VCM driver 209, a transducer 210, and a voice coil 211.

The reset determination unit 201 monitors the voltage of supplied power, and if the voltage is less than a power-on reset threshold voltage, forcibly moves the transducer 210 to a parked position and generates a power-on reset control signal to reset the controller 202.

Power-on reset retry information is stored at address 0708H to address 070aH of the memory 203, and addresses 0708H to 070aH are not initialized during power-on initialization. The power-on reset retry information is composed of power-on reset retry identification data ID and retry count data at the startup of the spindle motor 205. The power-on reset retry identification data ID is written in addresses 0708H and 0709H of the memory 203, and the retry count data is written in address 070aH.

The pre-amplifier 206 includes an amplification circuit amplifying a signal detected by the transducer 210, a read current control circuit supplying an optimal read current to the transducer 210, and a write current control circuit supplying a write current to the transducer 210.

The operation of the HDD will now be described. In a data read mode, the pre-amplifier 206 amplifies an electrical signal detected by the transducer 210 (i.e., the head) from a disk to enable signal processing afterwards. Thereafter, the write/read channel circuit 207 encodes the amplified analogue signal into a digital signal that can be decoded by a host device (not shown), converts the digital signal into a data stream, and transfers the data stream to the host device via the interface circuit 208.

In a data write mode, the write/read channel circuit 207 receives data from the host device via the interface circuit 208, converts the received data into a binary data stream suitable for a write channel, and then the transducer 210 writes the data by using the disk write current amplified by the pre-amplifier 206.

The controller 202 controlling the overall operation of the disk drive also controls peripheral circuits to analyze a command received via the interface circuit 208 and implements the command. The controller 202 is also coupled to the VCM driver 209 that supplies a driving current to the voice coil 211, and supplies a control signal to the VCM driver 209 to control excitation of the VCM and the movement of the transducer 210.

Further, the controller 202 manages the power-on reset retry information stored in specific areas of the memory 203 which are not initialized upon power-on initialization during which power is initially supplied to the disk drive, and determines a startup current to be supplied to the spindle motor corresponding to a retry count included in the power-on reset retry information.

The controller 202 determines the startup current to be supplied to the spindle motor 205 as a normal spindle startup current if the power-on reset retry count is "0", and decreases the startup current of the spindle motor from the normal spindle startup current by a predetermined amount as the power-on reset retry count increases.

In detail, in a power-on initialization mode, referring to FIG. 6A, the controller 202 performs first, second, and third processes. In the first process, the memory 203, except at addresses 0708H to 070aH, is initialized. In the second process, it is determined whether data read from the areas with addresses 0708H and 0709H of the memory 203 are identical to an initially set power-on reset retry identification data ID (e.g., 55aa and a5a5). If it is determined in the second process that the two data are not identical to the initially set power-on reset retry identification data, in the third process, the power-on reset retry identification data 55aa and a5a5 are written to addresses 0708H and 0709H in the memory 203 and retry count data "0000" indicating a power-on reset retry count of 0 is written to address 070aH, as shown in FIG. 6B. If it is determined in the second process that the two data are identical to the power-on reset retry identification data, in the third process, the value of the retry count data is increased by one time and written to address 070aH of the memory 203.

If the memory 203 is a non-volatile memory and the spindle motor is successfully started, the controller 202 writes currently set spindle motor startup current information to addresses of the memory 203 except addresses 0708H and 0709H, and erases the power-on reset retry information written to address 0708H-0709H of the memory 203.

However, if the memory 203 is a volatile memory and the spindle motor is successfully started, the controller 202 writes the currently set spindle motor startup current information to of the memory 203 except addresses 0708H and 0709H.

Figure 3:
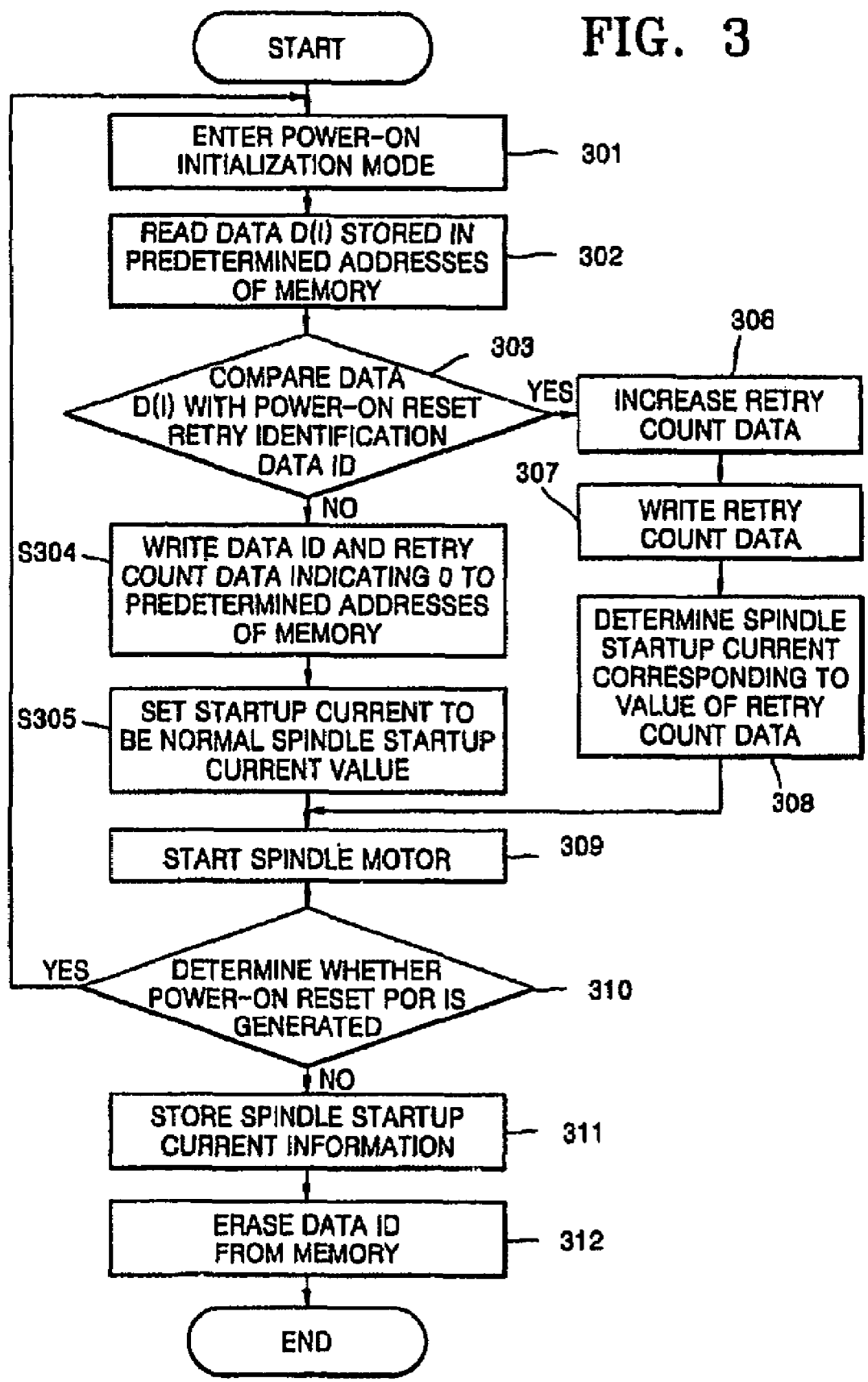
FIG. 3 is a flow chart illustrating a method of controlling a startup current of a spindle motor according to an embodiment of the present invention.
Figure 4:
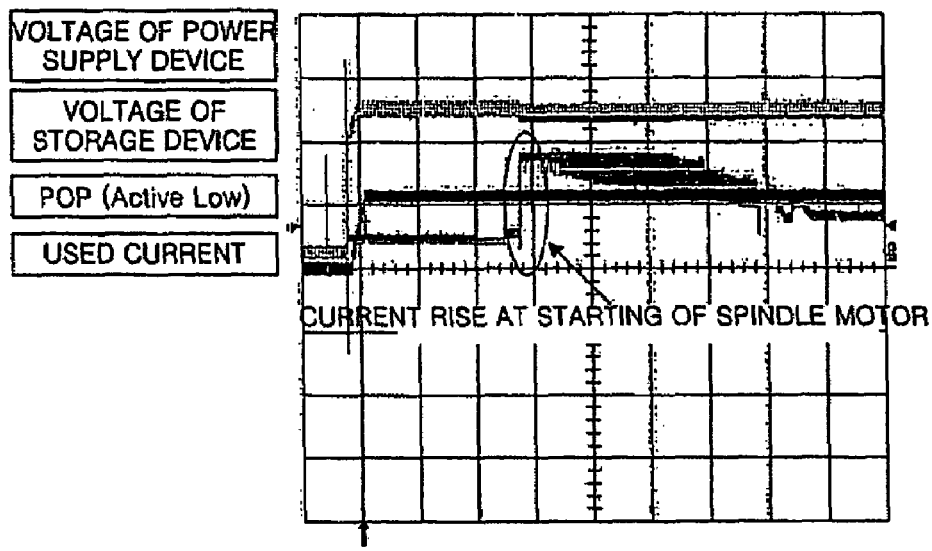
FIG. 4 is a graph illustrating an increase in current at the startup of the spindle motor.

Next, a method of controlling a spindle motor startup current according to an embodiment of the present invention will be explained with reference to the disk drive of FIG. 2 and the flow chart of FIG. 3.

If power is supplied to the disk drive, a power-on initialization mode is entered in operation 301. In the power-on initialization mode, addresses of the memory except 0708H to 070aH, which are assigned to manage power-on reset retry information as shown in FIG. 6A, are initialized.

Next, in operation 302, data D(i) stored in the areas with addresses 0708H and 0709H assigned to store power-on reset retry identification data ID of the memory 203 are read.

In operation 303, the data D(i) read from addresses 0708H and 0709H in the memory 203 are compared with initially set power-on reset retry identification data ID. If it is determined that the data D(i) read from the areas with addresses 0708H and 0709H of the memory 203 are not identical to the initially set power-on reset retry identification data ID in operation 303, operation 304 is performed. In operation 304, the initially set power-on reset retry identification data ID is written to addresses 0708H and 0709H in the memory 203 and retry count data "0000" indicating a retry count of 0 RETRY #0 is written to address 070aH of the memory 203. Then, in operation S305, the startup current of the spindle motor is determined to be a normal spindle startup current value.

Figure 5:
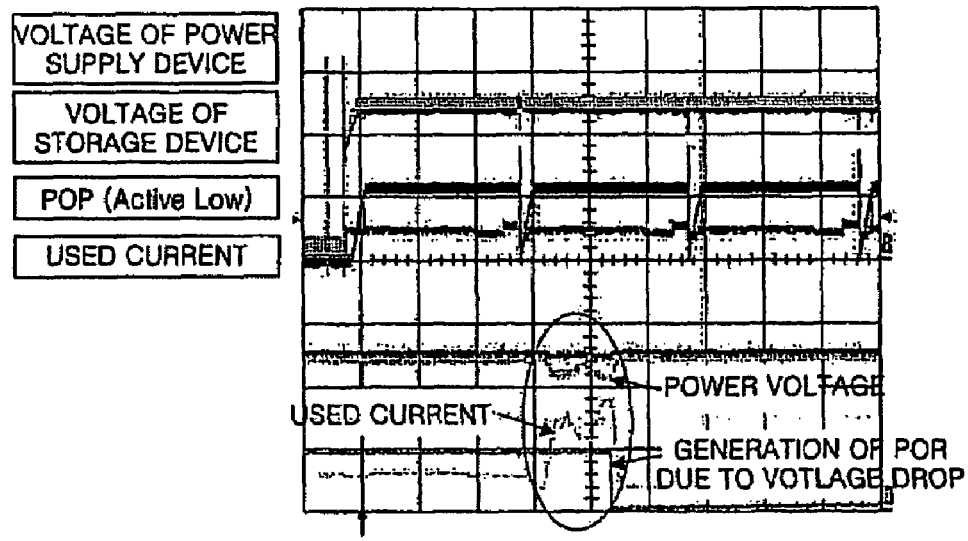
FIG. 5 is a graph illustrating the occurrence of a power-on reset due to a voltage drop at the startup of the spindle motor.

However, if it is determined that the data D(i) read from addresses 0708H and 0709H in the memory 203 is identical to the initially set power-on reset retry identification data ID in operation 303, operation 306 is performed. In operation S306, the value of retry count data indicating a retry count RETRY # stored in the area with address 070aH in the memory 203 is read and increased by one. Then, in operation S307, the retry count data increased by one is written to address 070aH in the memory 203. The fact that the data stored in addresses 0708H and 0709H are identical to the initially set power-on reset retry information data and the retry count, respectively means that a power-on reset has already occurred at the startup of the spindle motor. That is, if current is excessively consumed at the startup of the spindle motor, the voltage of power drops below a predetermined level due to the excessive current consumption, and thus a power-on reset POR is generated, as indicated in FIG. 5.

Next, in operation 308, a spindle startup current corresponding to the retry count data indicating the retry count RETRY # that is written to address 070aH in the memory 203 is determined again. As the retry count increases, the spindle motor startup current value decreases from the normal spindle startup current value by a predetermined value. After the spindle startup current is determined in operation 305 or 308, operation 309 is performed. In operation 309, the spindle motor is started using the determined spindle startup current.

In operation 310, it is determined whether a power-on reset occurs by starting the spindle motor and monitoring whether the voltage of power drops below a power-on reset threshold voltage. If it is determined in operation 310 that a power-on reset occurs, operation S301 is performed and the power-on initialization mode is entered. The fact that the power-on reset occurs means that a large voltage drop has occurred due to a currently set spindle startup current.

If it is determined in operation 310 that a power-on reset has not occurred and the spindle motor is successfully started, operation 311 is performed. In operation S311, currently set spindle startup current information is written to addresses of the memory 203 other than addresses 0708H and 0709H. This is to update the information used to determine the spindle startup current used when the stopped spindle motor is restarted.

Next, if the memory 203 is a non-volatile memory, such as a flash memory, in operation S312, the power-on reset retry identification data ID stored in the areas with addresses 0708H and 0709H in the memory 203 is erased. The retry count data stored at address 070aH of the memory 203 can be erased at the same time. This is because data remains even after power is turned off, and thus the power-on reset retry identification data ID should be erased so that the method of the present invention can be used after the power supply is cut off. However, if the memory 203 is a volatile memory, operation 312 can be omitted.

Accordingly, the method of the present embodiment can be used to stably start the spindle motor while reducing the possibility of the repeated occurrence of a repeatedly generated power-on reset by adaptively determining startup current of the spindle motor of the HDD according to the occurrence of a power-on reset and the power-on reset retry count.

External HDDs (2.5" or less) generally use universal serial bus (USB) power as input power. Here, the USB cannot provide sufficient current in many cases, and a USB cable line is long such that there is a high power-on reset possibility due to voltage drop at the startup of a spindle motor. If the present invention is applied to such external HDDs (2.5" or less), the repeated occurrence of a power-on reset is prevented during the startup of the spindle motor, and the spindle motor can be stably started.

As described above, according to the present invention, since the spindle startup current of the disk drive is adaptively determined according to the generation of the power-on reset due to a voltage drop, the repeated occurrence of the power-on reset can be prevented and the spindle motor can be stably started.

The invention may be accomplished by a method, an apparatus, a system, and so on. If it is performed by software, constitutional elements of the present invention are code segments that perform essential operations. Programs or code segments can be stored in processor-readable media, and can be sent by computer data signals combined with carrier waves via transmission media or communication networks. The processor readable media include any media that can store or transmit information. Examples of the processor readable media are electronic circuits, semiconductor memory devices, read-only memories (ROMs), erasable ROMs, floppy disks, optical disks, hard disks, optical fiber media, and radio frequency (RF) networks. The computer data signals include any signals that can be transmitted over transmission media, such as electronic network channels, optical fibers, air, electronic systems, and RF networks.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of controlling a motor of a disk drive, the method comprising:
   managing power-on reset retry information generated during the startup of the motor; and
   determining a startup current of the motor that corresponds to a power-on reset count included in the power-on reset retry information,
   wherein when the startup current of the motor is determined to be a normal motor startup current if the power-on reset retry count is "0", and is decreased from the normal motor startup current by a predetermined amount for each increase in the power-on reset retry count.

2. The method of claim 1, wherein the power-on reset retry information comprises power-on reset retry identification data and retry count data at the startup of the motor.

3. The method of claim 1, wherein the power-on reset retry information is stored in a recording medium.

4. The method of claim 3, further comprising
   erasing the power-on reset retry information stored in a recording medium if the recording medium is a non-volatile memory and the motor is successfully started.

5. The method of claim 3, wherein the recording medium is a volatile memory.

6. The method of claim 5, further comprising storing the currently set motor startup current information if motor is successfully started.

7. The method of claim 3, wherein the power-on reset retry information comprises power-on reset retry identification data and retry count data at the start up of the motor.

8. The method of claim 1, wherein the motor is a spindle motor.

9. A method of controlling a motor of a disk drive, the method comprising:
managing power-on reset retry information generated during the startup of the motor; and
determining a startup current of the motor that corresponds to a power-on reset count included in the power-on reset retry information,
wherein the managing of the power-on reset retry information comprises
initializing all but predetermined addresses of a recording medium in a power-on initialization mode;
determining whether data stored at the predetermined addresses of the recording medium are identical to initial power-on reset retry identification data; and
writing power-on reset retry identification data and retry count data indicating a power-on reset retry count of "0" to the predetermined addresses of the recording medium if the data stored predetermined addresses of the recording medium are not identical to the initial power-on reset retry identification data, and increasing the value of the retry number data by one and writing the retry number data to the memory if the data stored at predetermined addresses of the recording medium are identical to the initial power-on reset retry identification data.

10. A data storage disk drive comprising:
a disk storing information;
a motor rotating the disk;
a recording medium storing power-on reset retry information;
a reset determination unit monitoring a voltage of power and generating a power-on reset control signal if a voltage less than a power-on reset threshold voltage is detected;
a controller performing a power-on reset according to the power-on reset control signal, managing the power-on reset retry information stored in predetermined areas of the recording medium, which are not initialized during power-on initialization, and determining a startup current of the motor corresponding to a power-on reset retry count included in the power-on reset retry information; and
a motor driver generating the motor startup current corresponding to the startup current of the motor determined by the controller and supplying the generated motor startup current to the motor,
wherein the controller determines the startup current value of the motor to be a normal motor startup current if the power-on reset try count is "0", and decreases the startup current of the motor from the normal motor startup current by a predetermined amount for each increase in the power-on reset retry counts.

11. The disk drive of claim 10, wherein the power-on reset retry information comprises power-on reset retry identification data and retry count data at the startup of the motor.

12. The disk drive of claim 10, wherein if the recording medium is a non-volatile memory and the motor is successfully started, the controller stores the currently set motor startup current information in the recording medium and erases the power-on reset retry information stored in the recording medium.

13. The disk drive of claim 10, wherein if the recording medium is a volatile memory and the motor is successfully started, the controller stores the currently set the motor startup current information in the recording medium.

14. The disk drive of claim 10, wherein the motor is a spindle motor.

15. The disk drive of claim 10, wherein the power-on reset retry information is stored at the predetermined areas of the recording medium.

16. A data storage disk drive comprising:
a disk storing information;
a motor rotating the disk;
a recording medium storing power-on reset retry information;
a reset determination unit monitoring a voltage of power and generating a power-on reset control signal if a voltage less than a power-on reset threshold voltage is detected;
a controller performing a power-on reset according to the power-on reset control signal, managing the power-on reset retry information stored in predetermined areas of the recording medium, which are not initialized during power-on initialization, and determining a startup current of the motor corresponding to a power-on reset retry count included in the power-on reset retry information; and
a motor driver generating the motor startup current corresponding to the startup current of the motor determined by the controller and supplying the generated motor startup current to the motor,
wherein the controller initializes all but predetermined areas of the recording medium in a power-on initialization mode, determines whether data stored in the predetermined areas of the recording medium are identical to initial power-on reset retry identification data, and writes power-on reset retry identification data and retry count data indicating a power-on reset retry count of "0" to the predetermined areas of the recording medium if the data are not identical to the initial power-on reset retry identification data, or increases the value of the retry count data by one and writes the retry count data to the recording medium if the data are identical to the initial power-on reset retry identification data.

* * * * *

UNITED STATES PATENT AND TRADEMARK OFFICE
CERTIFICATE OF CORRECTION

PATENT NO. : 7,531,983 B2  
APPLICATION NO. : 11/248161  
DATED : May 12, 2009  
INVENTOR(S) : Jun Jeong et al Page 1 of 1

It is certified that error appears in the above-identified patent and that said Letters Patent is hereby corrected as shown below:

Column 7, Line 54, change "try" to --retry--.

Signed and Sealed this

Twenty-fifth Day of August, 2009

David J. Kappos  
*Director of the United States Patent and Trademark Office*